(12) United States Patent
Marzolin et al.

(10) Patent No.: US 7,786,033 B2
(45) Date of Patent: Aug. 31, 2010

(54) SUBSTRATE WITH A PHOTOCATALYTIC COATING

(75) Inventors: Christian Marzolin, Paris (FR);
Arnaud Marchal, Ecouen (FR); Xavier Talpaert, Paris (FR)

(73) Assignee: Saint-Gobain Recherche, Aubervilliers (FR)

( * ) Notice: Subject to any disclaimer, the term of this patent is extended or adjusted under 35 U.S.C. 154(b) by 0 days.

(21) Appl. No.: 11/432,322

(22) Filed: May 12, 2006

(65) Prior Publication Data

US 2006/0205304 A1  Sep. 14, 2006

Related U.S. Application Data

(62) Division of application No. 09/719,153, filed as application No. PCT/FR99/01375 on Jun. 10, 1999, now Pat. No. 7,309,664.

(30) Foreign Application Priority Data

Jun. 10, 1998 (FR) .................................. 98 07276

(51) Int. Cl.
*D04H 3/00* (2006.01)
(52) U.S. Cl. ...................... 442/332; 442/108; 442/149; 442/180; 442/327; 442/330; 442/331; 442/417
(58) Field of Classification Search .................. 442/59, 442/131, 108, 149, 180, 327, 330–332, 417
See application file for complete search history.

(56) References Cited

U.S. PATENT DOCUMENTS 4,211,813 A    7/1980  Gravisse et al.
4,966,759 A *  10/1990 Robertson et al. ........... 422/186
5,547,649 A *  8/1996  Beck et al. .................. 423/230

(Continued)

FOREIGN PATENT DOCUMENTS

EP         876907 A2 * 11/1998

(Continued)

OTHER PUBLICATIONS

"Comparable." Webster's Ninth New Colegiate Dictionary, 1996.

(Continued)

*Primary Examiner*—Andrew T Piziali
*Assistant Examiner*—Peter Y Choi
(74) *Attorney, Agent, or Firm*—Oblon, Spivak, McClelland, Maier & Neustadt, L.L.P.

(57) ABSTRACT

A substrate includes a fibrous material in the form of mineral wool of insulation type and/or glass fibers of reinforcement type, and a coating provided over at least a portion of a surface of the fibrous material, the coating having photocatalytic properties and including at least partially crystallized semiconductor material which has photocatalytic properties and which is of the oxide or sulphide type, and a bonding agent configured to adhere fibers of the fibrous material to each other, the bonding agent including an adhesion promoting agent configured to promote the adhesion of the coating to the fibrous material. The bonding agent is selected from one of an adhesive agent for mineral wool, a sizing agent for reinforcing threads, a bonding agent for a mat or web obtained from reinforcement threads, and an adhesive agent for a web obtained from glass wool.

15 Claims, 2 Drawing Sheets

U.S. PATENT DOCUMENTS

| | | | |
|---|---|---|---|
| 5,547,823 A | | 8/1996 | Murasawa et al. |
| 5,854,169 A | * | 12/1998 | Heller et al. ................ 502/242 |
| 6,037,289 A | | 3/2000 | Chopin et al. |
| 6,103,363 A | | 8/2000 | Boire et al. |
| 6,165,619 A | * | 12/2000 | Ikenaga et al. .............. 428/448 |
| 6,326,079 B1 | | 12/2001 | Philippe et al. |

FOREIGN PATENT DOCUMENTS

| | | |
|---|---|---|
| JP | 08252305 A | 10/1996 |
| JP | 08269391 A | 10/1996 |
| JP | 10025696 A | 1/1998 |

OTHER PUBLICATIONS

Application of Powder Diffraction for Study of Nanomaterials, Mar. 3, 2005, <http://www.xrd.us/applnote/nanomaterials.htm>.

U.S. Appl. No. 11/926,685, filed Oct. 29, 2007, Marzolin, et al.

* cited by examiner

SUBSTRATE WITH A PHOTOCATALYTIC COATING

CROSS-REFERENCE TO RELATED APPLICATIONS

This application is a Divisional of U.S. patent application Ser. No. 09/719,153, filed Mar. 16, 2001, which is a 371 of International Patent Application No. PCT/FR99/01375, filed Jun. 10, 1999, and claims priority to French Patent Application No. 98/07276, filed Jun. 10, 1998. The entire contents of U.S. patent application Ser. No. 09/719,153 is included herein by reference.

BACKGROUND OF THE INVENTION

1. Field of the Invention

The present invention relates to substrates provided with a photocatalytic coating, and to the process for producing such a coating and to its various applications.

It relates more particularly to coatings comprising semi-conducting materials based on metal oxide, in particular on titanium oxide, which are capable of initiating radical reactions under the effect of radiation of appropriate wavelength, resulting in the oxidation of organic products. These coatings thus make it possible to confer novel functionalities on the materials which they cover, in particular dirt-repellent, fungicidal, bactericidal, algicidal or odour-controlling properties, optionally in combination with hydrophilic or anti-condensation properties, and the like.

2. Discussion of the Background

Highly diverse substrates have to date been envisaged, in particular construction materials used in the field of construction or vehicles (windows, facing, cladding or roofing materials, and the like) or materials used in purification processes.

International Patent Applications WO97/10186 and WO97/10185 have thus made known coatings comprising anatase crystallized $TiO_2$ with photocatalytic properties, coatings obtained from the thermal decomposition of appropriate organometallic precursors and/or from "precrystallized" $TiO_2$ particles, suited in particular to deposition as a thin layer on glass in order to preserve its optical quality.

Patent Application EP-A-0,306,301 has also made known the use of photocatalytic $TiO_2$ on fibrous materials used to purify the air, the deposition of the $TiO_2$ being carried out by a process of sol-gel type.

SUMMARY OF THE INVENTION

The aim of the invention is then the improvement of these photocatalytic coatings, being targeted in particular at improving their behaviour on any type of substrate and in particular providing them with better adhesion and better durability, particularly on substrates exhibiting characteristics of surface roughness of porosity.

The subject-matter of the invention is first of all a substrate comprising a fibrous material which is provided, over at least a portion of its surface and/or within its thickness, with a coating with photocatalytic properties comprising a semi-conducting material with photocatalytic properties of the oxide or sulphide type in combination with a promoter of adhesion to the said fibrous material.

The semi-conducting material "active" with respect to photocatalysis can be, according to the invention, based on at least partially crystallized metal oxide, for example zinc oxide, tin oxide or tungsten oxide. The preferred example according to the invention relates to titanium oxide at least partially crystallized in anatase form, which is the crystalline phase which confers on $TiO_2$ its photocatalytic properties. It can also relate to semi-conductors belonging to the family of the sulphides, also at least partially crystallized, such as zinc sulphide or boron sulphide. (In the continuation of the text, for greater simplicity, mention will be made of titanium oxide, it being understood that the information given will be just as valid for the other semi-conducting materials mentioned above).

The term "fibrous material" is understood to mean, within the meaning of the invention, any material comprising fibres, in particular mineral fibres, more particularly organized fibres made of glass or rock mineral wool, of the type of those used in thermal/sound insulation or to constitute soilless culture substrates. This term "fibrous material" also includes fibres/filaments organized as strands, of the type of the strands used in reinforcement, in particular made of glass.

These base fibrous materials are subsequently incorporated in a "substrate", within the meaning of the invention, in various forms: it can relate to felts, mats, webs, "moulds" intended for the insulation of pipes, made of mineral wool, textile strands assembled as fabrics, or non-woven web, made of substrates of paper type, and the like.

A photocatalytic coating makes it possible to confer highly advantageous novel functionalities on these known substrates. Thus, the felts/mats of mineral wool mainly used in insulation can be treated only superficially, only on one of their faces, for example, or on each of their faces, and can acquire a dirt-repellent/odour-controlling function on at least one of their treated faces (the visible face and/or the hidden face) in false ceiling structures of buildings, in antinoise screens alongside roads or railways, and the like, the condition laid down being that the photocatalytic coating is accessible to a natural or artificial light source. Still in the field of insulation, the "moulds" can also be treated on the inside and/or outside or over their entire thickness, for example, in order to confer on them a dirt-repellent and/or bactericidal or fungicidal function. In the form of mats or of moulds, the substrates treated according to the invention can advantageously be positioned around outlet conduits in any ventilation or air-conditioning system but also by being positioned inside these conduits, these devices being veritable breeding grounds for bacteria, the condition being that it is necessary to provide means for the photocatalytic coating to be exposed to sufficient ultraviolet radiation to be effective: on a visible external face, natural illumination may be sufficient. If not, the substrates have to be combined with artificial illuminating means of the halogen lamp or fluorescent tube type.

Another application relates to any system for reflecting and/or scattering natural light or light originating from artificial illuminating means, such as lampshades or curtains, when the substrate is, for example, in the web form.

The other main application, apart from thermal or sound insulation, of the substrates treated according to the invention relates to the filtration or the purification of fluids.

It can relate to any filter used in the filtration of gases, in particular of air, of paper web or filter paper type, used, for example, in the ventilation/air-conditioning systems for dwellings mentioned above or for industrial premises, vehicles or laboratory rooms with a controlled level of dust, of the "clean" room type.

The term "filter" covers two notions within the meaning of the invention, both the notion of true filtration, where particles are separated mechanically from the gas carrying them, and the notion of diffuser, in particular of odour-controlling diffuser, where the gas to be treated is not necessarily forced to pass through the photocatalytic substrate, where it can in particular simply be brought into contact with the latter, without retaining the suspended particles.

Mention may be made of many other applications of the gas "filters" according to the invention: they can also be used to purify any type of industrial gaseous effluent or any atmosphere of a given public place or building (as odour-controlling diffuser in the underground, for example). They can in particular make it possible to reduce the "VOC" (volatile organic compounds) level of a given gas stream or of a given atmosphere.

The filters, surface-treated or treated throughout their thickness, can become much more effective and much more durable; this is because the treatment according to the invention gives them the ability not only to remove microorganisms but also to decompose organic residues of fatty type, for example, particles which gradually block the filter. With the invention, these filters therefore have a longer lifetime. In addition, they have an odour-controlling function.

It can also relate to filters for liquids.

The liquid filters according to the invention have numerous applications: they can be used for the recycling of wastewater or for the recycling of water from systems for the irrigation of soilless culture substrates (for disinfecting the water). They can also fulfil a function of depollution, in particular depollution of soils, or a function of reprocessing/depolluting industrial liquid effluents.

The advantage of treating all these fibrous substrates according to the present invention has been seen. However, to furnish term with a photocatalytic coating was not, initially, very easy. This was because the question arose of the method of deposition of the coating on a substrate which is generally non-smooth, non-flat and of rough and porous type, as well as the question of the durability of this coating.

The solution of the invention consisted in adjusting the way in which it was applied to the substrate, namely superficially or throughout its thickness, according to the applications targeted as a function of requirements, and in rendering the anatase $TiO_2$ of the coating, which is responsible for the photocatalytic performance, integral with the fibrous material via an appropriate adhesion promoter. The latter can thus act as "matrix" for the components of the coating which are "active" with respect to the photocatalysis phenomenon.

According to a first embodiment of the present invention, the titanium oxide is already at least partially precrystallized in anatase form when it is incorporated in the coating, before being deposited on the substrate. It can be introduced into the coating in the form of crystalline particles in colloidal suspension or in the form of a dry power composed of particles which are optionally more or less agglomerated with one another. This alternative form exhibits the advantage of not imposing a high specific heat treatment on the coating/substrate on which it is deposited ($TiO_2$ crystallizes in the anatase form generally in the vicinity of 400° C.).

According to a second embodiment of the present invention which can be combined with the first embodiment, the titanium oxide originates from the thermal decomposition of precursors, in particular of the organometallic or metal halide type, within the coating. The anatase crystallized $TiO_2$ can thus be manufactured "in situ" in the coating, once applied to the substrate, by providing for an ad hoc heat treatment, which must, however, be compatible with the chosen substrate and the chosen adhesion promoter.

The adhesion promoter can be single- or multicomponent, and its component or components can be organic, inorganic or organic/inorganic "hybrids".

It can thus comprise a silicon-comprising component, in molecular form or in polymeric form, of the silane, silicone or siloxane type, for example. This is because these components exhibit a good affinity with the majority of mineral fibres, glass, rock or even ceramic, affecting the invention. It is even possible, in some cases, to speak of a kind of grafting of the crystallized $TiO_2$ to the inorganic fibres by this type of component.

The adhesion promoter can also comprise one or more polymers of organic type. In fact, two scenarios exist: standard organic polymers, for example of the acrylic or phenol-formaldehyde type, or the like, can be chose. In this case, there is a risk of this component being gradually decomposed by photocatalysis by the $TiO_2$, at least in the surface regions of the substrate liable to be exposed to ultraviolet radiation. However, the process can in fact prove to be advantageous in some applications, by thus gradually "releasing" active $TiO_2$. However, it may be preferable to avoid or slow down as far as possible this decomposition by choosing appropriate polymers, generally fluorinated polymers, which are highly resistant to photocatalytic attacks, for example of the fluorinatd acrylic polymer type, of the polytetrafluoroethylene (PTFE), poly (vinylidene fluoride) (PVDF) or tetrafluoroethylene-ethylene copolymer (ETFE) type, and the like.

One alternative is retaining an adhesion promoter based on organic polymer(s) and thwarting their decomposition by appropriate additives, in particular belonging to the family of the antioxidants (such as the product sold under the name Irganox by the company Ciba) and/or of the ultraviolet absorbers (such as the product sold under the name Tinuvin by the same company) and/or of stabilizers in the form of sterically hindered amines known under the term "hindered amine light stabilizers" or "HALS".

The adhesive promoter can also comprise at least one metal oxide of the $TiO_2$ or $SiO_2$ type originating from the thermal decomposition of precursors of the silicon-comprising, organometallic or metal halide type within the coating. In this case, the $TiO_2$ or $SiO_2$ component is generated in situ in the coating, in particular once applied to the substrate, by an appropriate heat treatment compatible with the substrate. In the case of $TiO_2$, it is not, however, necessary to envisage very high temperatures necessary for an anatase crystallization, if only an adhesion promoter function is being sought: it can perfectly well be amorphous or partially crystallized in various crystalline forms, just like $SiO_2$. It is thus possible to have a coating of the amorphous metal oxide matrix type which fixes the "active" particles of crystallized photocatalytic oxide.

The adhesion promoter can also comprise at least one inorganic component chosen from aluminium phosphates and potassium or calcium aluminosilicates.

One embodiment of the invention consists in that at least one of the two essential components of the coating, namely, on the one hand, the "active" (with regard to photocatalysis) components and, on the other hand, the adhesion promoter, forms part of the binder making possible the intrinsic cohesion of the fibrous material.

This is because, if the material is glass or rock mineral wool of the insulation type, such as that produced by Isover Saint-Gobain, the latter is in numerous applications provided with a binder generally denoted under the name of size and generally applied in the liquid phase by spraying under the fiberizing devices. The solvent/dispersant is generally aqueous and it evaporates on contact with or in the vicinity of the hot fibres. The agents for sticking the fibres to one another, generally of the resin type, for example phenolic resin, such as urea-phenol-formaldehyde polymers, cure under hot conditions. One possibility then consists in adding the adhesion promoter and the "active" components to the aqueous medium of the size or even in using/adapting the components of the size in order for them to act simultaneously as binder of the fibres to one another and of promoter of fibres/"active" components adhesion.

For further details on typical sizing compositions and their method of application to fibres, reference may advantageously be made in particular to Patents EP-148,050, EP-246, 952, EP-305,249, EP-369,848, EP-403,347, EP-480,778 and EP-512,908. However, it should be noted that, in specific applications, the mineral wool can be devoid of binder, for example that composed of relatively fine fibres used to prepare filter papers, as disclosed, for example, in Patents EP-0,267,092 and EP-0,430,770, or needled felts.

If the material is instead a fibrous material of reinforcing strands or textile strands type, in particular such as that manufactured by Vetrotex, the cohesiveness of the strands resulting from the assembling of individual filaments under a bushing is generally provided by application of a binder generally denoted under the term of sizing composition. Here again, it is applied in the liquid phase and comprises one or more agents "sticking together" the fibres/filaments. It is therefore possible to choose to add the "active" components and/or the adhesion promoter according to the invention to the liquid medium or to adapt its composition in order to make it act both as interfilament binder and as promoter of strands/"active" components adhesion.

For further details on sizing compositions, reference may advantageously be made in particular to Patents EP-243,275, EP-394,090, EP-635,462, EP-657,396, EP-657,395, EP-678, 485, EP-761,619 and WO-98/18737.

Mention may also be made of Patent WO-98/51633, relating to the deposition of size in two steps under the fiberizing device, size in addition being capable of polymerizing at room temperature. In this case, it is possible to choose to introduce the material with photocatalytic properties either into the first sizing composition or into the second or into both.

All these sizes mentioned above are generally applied, using sizing rolls just under the bushing, to the fibrous material still in the form of individual filaments in the course of being gathered together into strands. There also exist binders, intended to ensure the cohesion of mats obtained from a blanket of glass strands, which are ejected onto continuous or non-continuous strands which have already been sized. Mention may be made, by way of example, of Patent WO-97/21861. The photocatalytic material can be incorporated in this binder, which also acts as adhesion promoter.

The sizes or binders mentioned above are either in the aqueous phase or in the non-aqueous phase. In the latter scenario, a heat treatment is generally no longer necessary to remove the water, the components chosen then being chosen so as to be able to polymerize at room temperature. In this case, the incorporation of materials with photocatalytic properties pre-existing independently of any heat treatment is favoured, such as small crystallized titanium oxide particles.

As mentioned above, the fibrous material according to the invention can therefore be organized in the web (facing, for example), felt or paper form or in various geometric forms (flat or pleated paper type sheets, for example, panel, hollow cylindrical "mould", woven or non-woven web, and the like). The fibrous material can also be in bulk, in the form of optionally graded short fibre or flocks.

The photocatalytic coating of the invention is advantageously applied to the fibrous material so that at least a portion of the "fibres" of the said material (including the notions of fibres, of filaments and of strands) is sheathed with the coating over a thickness of at least 5 nm, in particular over a thickness of the order of 30 to 50 nm.

This sheathing ensures maximum effectiveness of the coating, its photocatalytic activity increasing as it is distributed over a greater specific surface. The preferred thickness takes into account the most commonly encountered mean size of the anatase $TiO_2$ crystallites.

Another subject-matter of the invention is the processes for the manufacture of the substrates defined above.

According to a first alternative form, the photocatalyic coating is deposited, in the liquid phase, on the production line itself for the fibrous material. The advantage to this alternative form lies in the fact that the still semi-finished fibrous material can be treated an the best use can be made of the temperature which it is at, for example, resulting in a saving in terms of time and of production cost. This, a first embodiment consists in "hot" depositing the coating between the fiberizing devices and the devices for receiving the fibres. The fiberizing devices can consist of glass centrifuging dishes, known as "internal centrifuging devices", such as ones disclosed, for example, in Patents EP-0,189,534 and EP-0,519,797, making it possible to fiberize mineral wool of glass type, or devices for fiberizing by so-called external centrifuging using a succession of centrifuging wheels, such as ones disclosed, for example, in Patents EP-0,465,310 or EP-0,439,385, making it possible to obtain mineral wool of basalt rock type. It can also relate to devices for fiberizing by mechanical drawing, in order to obtain reinforcing glass strands, by air blowing or by steam blowing, according to processes well known to persons skilled in the art. Use is thus made of the fact that the fibres are still at a relatively high temperature by applying the coating, generally in solution/dispersion, in a solvent, for example an aqueous solvent, which evaporates on contact with or in the vicinity of the fibres. The heat can also make it possible to cure the component or components of the adhesion promoter, if they are of the resin type, or to decompose them thermally, if they are of the silicon-comprising precursor or metallic precursor type mentioned above.

As mentioned above, the coating in the liquid phase can be applied at the same time as an optional "binder" of the sizing composition type or even form part of it. It may also be preferable to apply it to the fibrous material before or after the said "binder".

According to a second embodiment of this first alternative form, the photocatalytic coating, still generally in the liquid phase, can be deposited "after" the receiving devices which collect the fibres/filaments or strands resulting from the fiberizing devices and in particular before or during the post-fiberizing heat treatment of the fibrous material. Thus, for mineral wool of insulation type, the receiving devices are generally composed of a suction conveyor belt which gathers together the mineral wool and passes it into a forming oven. It can be judicious to apply the coating between the two devices (fiberizing/receiving), for example superficially, and to use the heat of the oven to cure or complete the coating, if necessary.

Likewise, in the field of reinforcing glass, the strands are drawn and wound off in the form of spools or cut up under the bushing, after having been appropriately sized, and then generally dried in heated chambers, before being converted and/or used.

As mentioned above, it is therefore possible to deposit the photocatalytic coating just under the bushing, in particular concomitantly with the deposition of the size, in which it can be incorporated. It is also possible to deposit it during the stage of finishing the spooled strands into finished products: it can, for example, relate to the conversion operation targeted at manufacturing mats of chopped strands, in a subsequent operation; it is also possible to deposit it on the downstream line, in particular during the conversion of the continuous strands, gathered together as a blanket, into a mat of continuous strands.

In the last two cases, the photocatalytic coating can be deposited by an ejection system of the adjusted sprayer type, before, during or at the same time as the binder used (or be used in combination with it in the same liquid phase).

According to a second alternative form, the photocatalytic coating is deposited in the liquid phase on the finished fibrous material, in a subsequent operation. What this involves is instead a "cold" treatment, requiring a post-deposition heat treatment in order to evaporate the solvent and optionally to cure or to complete, to constitute the coating.

Whatever the alternative form chosen, the coating can be deposited by different techniques. If the coating comprises "active" anatase crystallized $TiO_2$ powder or particles from the start, it is not necessary for the fibrous substrate to be very hot; temperatures of less than 300° C. and even of less than 200° C. may suffice, indeed even room temperature, and therefore temperatures which are found on production lines for the commonest mineral fibrous materials, temperatures which are in addition compatible with the sizes for these materials, which are generally organic, at least partly. If, on the other hand, it is necessary to generate anatase $TiO_2$ "in situ", it is necessary to envisage temperatures of the order of 400° C., instead with fibrous materials devoid of binder in the general sense of the term and in a subsequent operation, for example by a process of sol-gel type.

In concrete terms, it is possible to choose to impregnate the fibrous material to the core and to use a technique of "dip-coating" type, where the fibrous material is at least partially immersed in a bath comprising the coating in the liquid phase. It is also possible to choose coating or spraying adapted to a surface treatment. The deposition can also be carried out in a fluid which is non-liquid in the usual sense of the term, for example in a hypercritical fluid.

Another subject-matter of the invention relates to the application of these treated substrates to thermal/sound insulation or facing materials, with a dirt-repellent, fungicidal, antibacterial or odour-controlling function, or to liquid or gas filters of paper type or of felt or mould type.

BRIEF DESCRIPTION OF THE DRAWINGS

Other advantageous details and characteristics of the invention become apparent from the non-limiting embodiments described below in reference to the following figures.

DESCRIPTION OF THE PREFERRED EMBODIMENTS

Figure 1:
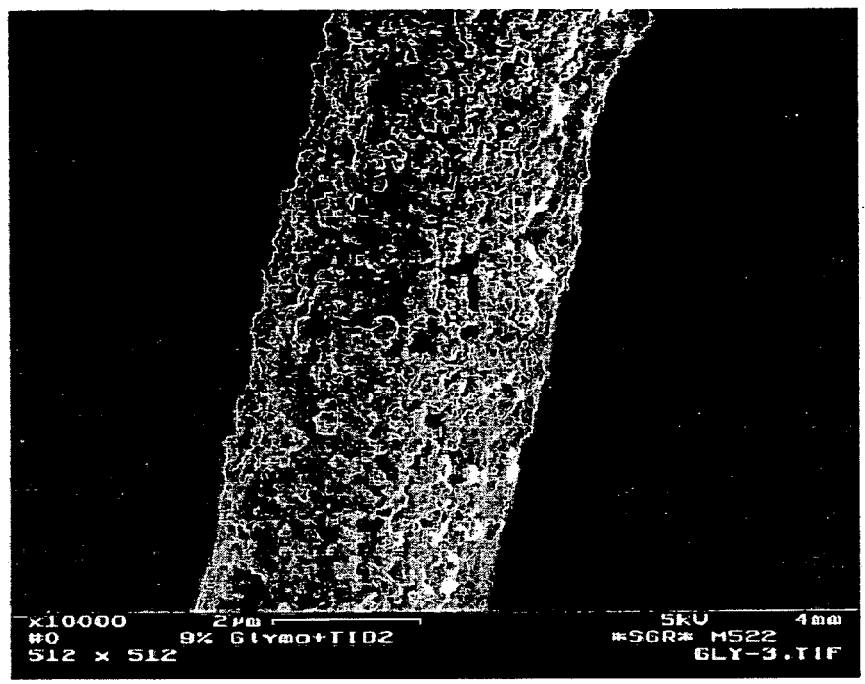
FIG. 1 shows a scanning electron microscopy (SEM) photograph of the surface of a fibrous material treated according to an embodiment of the invention.

All the following examples relate to the deposition of a coating for which the photocatalytic "active" components are made of anatase crystallized $TiO_2$. As mentioned above, the invention applies in the same way to semi-conducting "active" components with photocatalytic properties similar to anatase $TiO_2$ and which can be provided in the same form, in particular zinc oxide, tin oxide and tungsten oxide.

EXAMPLE 1 a needled felt (dimensions 210×297×5 mm$^3$) composed of glass fibers of insulating type obtained by binder-free internal centrifuging and with a relative density of 55 kg/m$^3$, was sprayed with an aqueous $TiO_2$ solution, sold under the trade name "ToSol" by Saga Céramics, over its entire thickness.

This solution containing particles of $TiO_2$ crystallized in anatase form, probably composed of crystallite agglomerates, these agglomerates having a mean size of the order of 20 to 80 nm. These particles are therefore the "active" components in terms of photocatalysis. The solution also contains an organometallic $TiO_2$ precursor which will decompose into predominantly amorphous $TiO_2$ by heat treatment and which will act as adhesion promoter.

The coating obtained was baked at 200° C. for 2 hours and contains anatase nanocrystals in an amorphous $TiO_2$ matrix. The yellow colour of the filter thus manufactured testifies to the presence of organic compounds originating from the precursor solution. After exposure to ultraviolet A radiation under a dose of 4 W/m2 for 2 hours, the yellow colour has completely disappeared, which shows complete decomposition of the residual organic pollutants.

EXAMPLE 2

Glass fibre of insulation type obtained by binder-free internal centrifuging was converted by the papermaking route in pure water. The paper obtained, circular with a diameter of 100 mm and a weight per unit area of 150 g/m2, was subsequently impregnated over its entire thickness by dip-coating it in an alcoholic dispersion containing, by volume, 5% water, 1% tetraethoxysilane (the adhesion promoter) and 1% anatase crystallized $TiO_2$ particles with a mean diameter of 30 nm (the "active" components). The paper was dried in the open air and then baked in an oven at 450 C for 30 minutes. This filter was subsequently placed over an inlet orifice of a fume cupboard. A control filter, without anatase $TiO_2$, was placed over the neighbouring orifice. An ultraviolet A lamp shines on these filters at a dose of 4 W/m2. After the cupboard had been operated for 15 days, the treated filter was still white, whereas the untreated filter was fouled.

EXAMPLE 3

A composition for the sizing of glass wool of insulation type obtained by internal centrifuging was manufactured by mixing:

55 G of resin obtained by condensation of phenol and formaldehyde in an initial formaldehyde/phenol molar ratio of approximately 3.2/1, which condensation is carried out conventionally with a catalyst in the form of sodium hydroxide at 5.5% by weight with respect to the phenol, 45 g of urea, 3 g of aminopropyltrimethoxysilane, 0.3 g of ammonium sulphate, 6 g of 30% by volume aqueous ammonia, 1200 g of a 25% by weight dispersion in water of anatase crystallized $TiO_2$ particles, and 34 litres of water.

The $TiO_2$ particles have a mean diameter of approximately 45 nm. The adhesion promoter for the latter can be regarded as all the other components of the size and very particularly the silane.

This composition was sprayed via the sizing ring during a fiberizing of the glass wool under the centrifuging dishes. The felt obtained was subsequently passed on the line into an oven at 180° C. for 2 minutes. The felt has a weight per unit area of 560 g/m$^2$ and a loss on ignition of 1.4% (measurement known to a person skilled in the art, expressed by weight, by heating the felt at a temperature sufficient to remove all the organic compounds). A 1×20×40 mm$^3$ piece was removed and placed in a vessel with 20 g of an aqueous solution comprising 1 g/l of ethanol and 15 mg/l of hydrogen peroxide. The solution was shone on by a mercury lamp producing 4 W/m$^2$ of ultraviolet radiation and the concentration of hydrogen peroxide was monitored by colorimetry. Oxidation of ethanol by hydrogen peroxide, catalysed by the anatase $TiO_2$ irradiated with ultraviolet radiation, is observed.

The photocatalytic activity of the felt was evaluated by measuring the weight of hydrogen peroxide $H_2O_2$ in milligrams which disappears per gram of fibre in the solution and per hour. The result was 4.4 mg $H_2O_2$/g.fibre/hour.

Samples of 200×300×200 mm3, coming from the same treatment, have been subjected to naturel sun exposure. Gradually the yellow colour, that is characteristic for the resin used, disappeared from the exposed surfaces and to some centimetres in depth. This vanishing clearly indicated a degradation of the phenolic resin used as well as the penetration of the photocatalytic effect inside the material. Similar results were obtained und controlled UVA radiation of 4 W/m$^2$ for 24 hours.

EXAMPLE 4

280 g of glycidoxypropyltrimethoxysilane were added to a sizing composition similar to that of Example 3 (other silane combining with the above to act as adhesion promoter). The felt obtained by fiberizing and sizing with this solution was stoved at 180° C. for 2 minutes. The felt has a weight per unit area of 1 kg/m$^2$ and a loss on ignition of 1.4%. The measurement of the photocatalytic activity, carried out as in Example 3, gave a value of 3 mg $H_2O_2$/g.fibre/hour.

Figure 2:
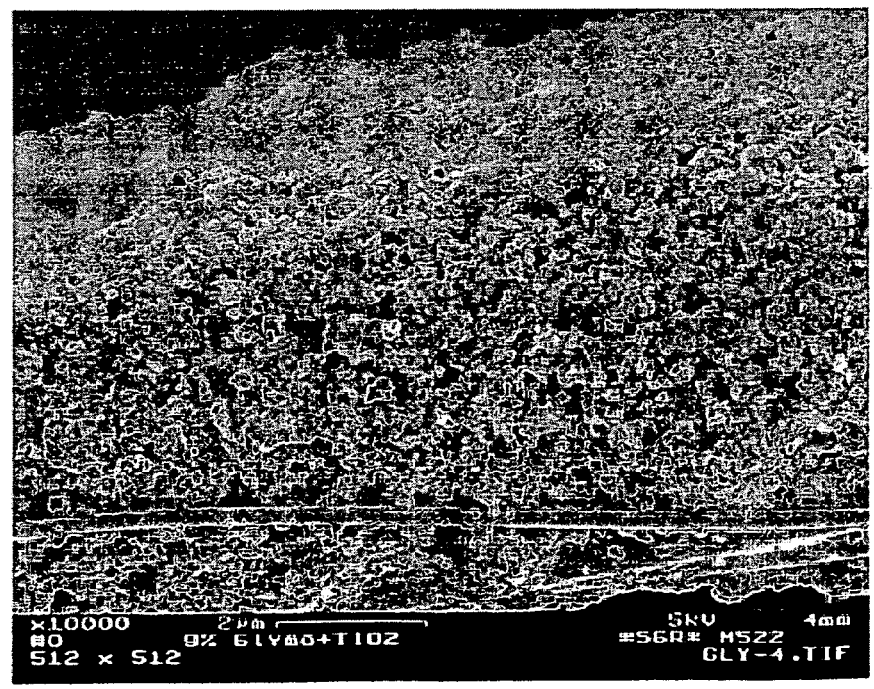
FIG. 2 is another SEM photograph showing the surface of the fibrous material shown in FIG. 1.
Figure 3:
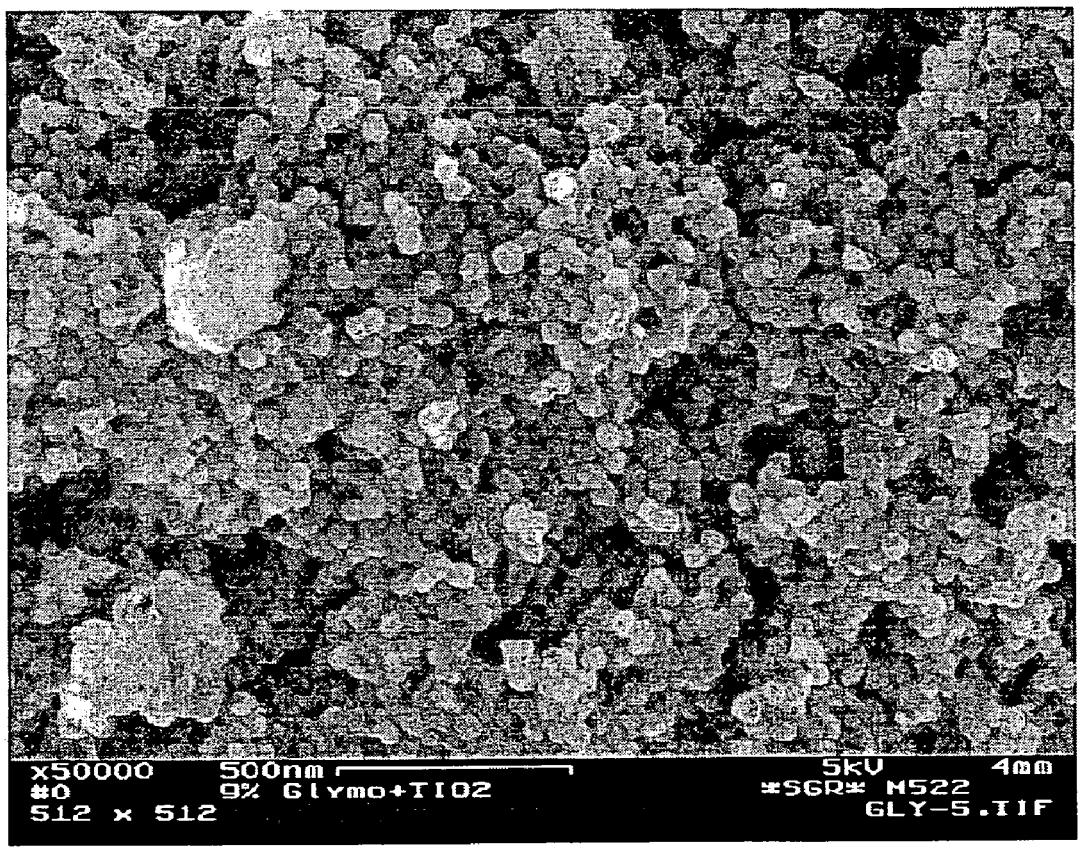
FIG. 3 is yet another SEM photograph showing the surface of the fibrous material shown in FIG. 1.

FIGS. 1, 2 and 3 show, in three different scales, a fibre covered with the photocatalytic coating. FIG. 1 shows more particularly a fibre, at the surface of which is clearly distinguished a sheathing of $TiO_2$ particles, two successive magnifications being shown in FIGS. 2 and 3.

In conclusion, it is found that the coating of the invention exhibits a proven photocatalytic activity on fibres, whatever the implementational alternative forms:

Example 1 illustrates a deposition "in a subsequent operation", outside the line for the production of mineral wool, using "precrystallized" $TiO_2$ particles and an inorganic adhesion promoter manufactured in situ, on a fibrous substrate of felt type.

Example 2 also illustrates a deposition "in a subsequent operation", on a fibrous substrate of paper type, with precrystallized $TiO_2$ particles and a silicon-comprising adhesion promoter.

Examples 3 and 4 illustrate an in-line hot deposition under the fiberizing devices, which will make possible treatment within the thickness of the fibrous material, with "precrystallized" $TiO_2$ particles and adhesion promoters of the family of the silanes in combination with the components of a standard size, in the aqueous phase.

Photocatalytic webs based on mineral fibres were manufactured using a plant which makes it possible to carry out the impregnation of a glass web in a sizing solution, the application os suction to this web (in order to remove the excess binder) and, finally, its baking in an oven, the entire process being carried out in-line and continuously. The web is unwound on a conveyor belt, conveyed into the sizing bath via an impregnation roller, passes above a negative-pressure tank (suction device) and is finally conveyed by a second conveyor belt into the baking oven.

Various types of photocatalytic media were synthesized according to this process, in accordance with the following examples:

EXAMPLE 5

A Medium for the Purification of Gases

An 80 g/m2 glass web was impregnated with an aqueous solution containing 3.1% of Glymo (glycidoxypropyltrimethoxysilane) and 2.9% of titanium dioxide nanoparticles at a rate of 0.2 m/min.

This web, having been subjected to a suction equivalent to a water column of 35 mm, was subsequently baked at 200° C. for 10 minutes. The resulting loss on ignition is 7%.

Measurements of effectiveness in the gas phase were then carried out under the following conditions: 150×200 mm$^2$ of the resulting product were placed in a cylindrical photocatalysis reactor. This reactor is composed of an axial UV-A lamp (365 nm), around which is surrounded, with a spacing of 1 cm, the photocatalytic medium in 3 layers, and of an aluminium jacket. The intensity of the irradiation on the web is 1 mW/cm$^2$. The reactor is inserted in a closed circuit, with recirculation, the gas passing through the medium from the inside of the closed cylinder over the web towards the outside.

The volume of the cell (photocatalysis reactor) is 0.9 l and that of the complete circuit (immobilized volume) is one litre. The experiments consisted in evaluating the photocatalytic decomposition of n-hexane.

To do this, various amounts of n-hexane (ranging up to 2000 ppm in air) were injected into the circuit, the flow rate of the latter being regulated at 1 l/min. At regular intervals, 50 μl samples of gas were withdrawn in order to measure the concerntration of n-hexane present in the circuit.

It was shown that the direct decomposition by UV of n-hexane is negligible, just as its absorption by the medium. In constrat, n-hexane is virtually 100% decomposed in less than one hour when it passes through the photocatalytic medium, though under weak UV irradiation.

EXAMPLE 6

A Medium for Liquid Purification

According to the same process, a 60 g/m glass web was impregnated in an aqueous solution comprising 1 g/l of A1100 silane and 5 g/l of titanium dioxide (sold under the name P25 by Degussa) held in suspension by appropriate means.

The web was impregnated in-line at 0.6 m/min, the excess binder having been removed under a negative pressure of 90 mm of water column. The poduct was baked at 300° C. for 30 minutes. Measurements of effectiveness in the liquid phase were then carried out in order to describe this material.

A circular specimen of web (diameter 100 mm) was placed at mid-height in a 300 ml beaker. The bottom and the edges of the receptacle having been rendered opaque, the beaker is illuminated by a bank of UV-A lamps (365 mm) delivering a power of 3.5 mW/cm2 to the web. An aqueous solution (deionized water) containing 10 mg/l of phenol is poured into the device and is kept stirred magnetically. The decrease in concentration of the phenol is then monitored, samples being withdrawn at regular time intervals, by a UV spectrometer sold by Dr Lange.

It could be confirmed that virtually 100% of the phenol had disappeared over approximately at most one hour.

More generally, these last two examples show the advantage of the use of a web formed of photocatalytic mineral fibres, such as those manufactured, in purification operations in a liquid medium as in the gas phase.

What is claimed is:

1. A substrate, comprising:
   a fibrous material including mineral fibers adhered to each other by a single coating only, the fibrous material being in the form of mineral wool, reinforcing threads, a mat or web obtained from reinforcement threads, and/or a web obtained from glass wool; and
   the coating having photocatalytic properties provided over at least a portion of a surface of the fibrous material, wherein
   the single coating includes
      at least partially crystallized semiconductor material which is at least partially precrystallized in anatase form when it is incorporated into the single coating, which has photocatalytic properties, and which includes oxide or sulphide materials, and
      a bonding agent configured to adhere the mineral fibers of the fibrous material to each other, the bonding agent including an adhesion promoting agent, which includes one or more organic polymers, configured to promote the adhesion of the single coating to the fibrous material, the bonding agent being selected from one of an adhesive agent for the mineral wool, a sizing agent for the reinforcing threads, a bonding agent for the mat or web obtained from reinforcement threads, and an adhesive agent for the web obtained from glass wool.

2. The substrate according to claim 1, wherein the at least partially crystallized semiconductor material includes titanium oxide in the form of anatase, and the semiconductor material is introduced into the single coating in the form of particles in a colloidal suspension or in the form of powder.

3. The substrate according to claim 1, wherein the adhesion promoting agent is an organic, mono- or multicomponent.

4. The substrate according to claim 1, wherein the adhesion promoting agent comprises the one or more organic polymers which are associated with additives which belong to the family of antioxidants family and/or ultra-violet absorbers and/or stabilisers of the amine type with steric hindrance.

5. The substrate according to claim 1, wherein the fibrous material is arranged in the form of a web, felt, shell, paper or loose material.

6. The substrate according to claim 1, wherein the single coating having photocatalytic properties covers at least a portion of the mineral fibers of the fibrous material over a thickness of at least 5 nm.

7. A method for producing a fibrous substrate, comprising:
   providing a fibrous material including mineral fibers, the fibrous material being in the form of mineral wool, reinforcing threads, a mat or web obtained from reinforcement threads, and/or a web obtained from glass wool;
   depositing at least partially crystallized semiconductor material having photocatalytic properties, and which includes oxide or sulphide materials in a liquid phase on the fibrous material to form a single coating, between fiber-forming elements involving a centrifuging plate, an element for forming fibers by means of external centrifuging, by means of mechanical fiber drawing, or pneumatic or steam fiber drawing, and fiber-receiving elements provided along a production line of the fibrous material, wherein the at least partially crystallized semiconductor material being at least partially precrystallized in anatase form when it is incorporated into the single coating; and
   adding a bonding agent for bonding the mineral fibers of the fibrous material to each other, which includes an adhesion promoting agent, including one or more organic polymers, configured to promote the adhesion of the single coating to the fibrous material, in the liquid phase, the bonding agent being included in the single coating and selected from one of an adhesive agent for the mineral wool, a sizing agent for the reinforcing threads, a bonding agent for the mat or web obtained from reinforcement threads, and an adhesive agent for the web obtained from glass wool.

8. The method of claim 7, further comprising:
   depositing the single coating having photocatalytic properties in the liquid phase on the production line of the fibrous material, downstream of the elements for receiving the mineral fibers formed by the fiber-forming elements, and before thermal processing/treatment elements.

9. The method of claim 7, further comprising:
   depositing the single coating having photocatalytic properties in the liquid phase on the fibrous material; and
   thermal processing the coated fibrous material.

10. The method of claim 7, further comprising:
    depositing the single coating in the fluid phase by at least one of spraying, coating, and immersion.

11. A thermal/acoustic insulation material having a substrate according to claim 1, wherein the substrate is configured to provide anti-staining, fungicidal, bactericidal, algaecidal or anti-odour properties.

12. A filter having a substrate according to claim 1, wherein the substrate is configured to provide anti-staining, fungicidal, bactericidal, algaecidal or anti-odour properties.

13. A purifier having a substrate according to claim 1, wherein the substrate is configured to provide anti-staining, fungicidal, bactericidal, algaecidal or anti-odour properties.

14. A liquid or gas diffuser having a substrate according to claim 1, wherein the substrate is configured to provide anti-staining, fungicidal, bactericidal, algaecidal or anti-odour properties.

15. The substrate according to claim 1, wherein the at least partially crystallized semiconductor material and the bonding agent are uniformly distributed within the single coating.

* * * * *